United States Patent [19]
Ekstrom

[11] 4,408,965
[45] Oct. 11, 1983

[54] WAVE POWERED TURBINE

[76] Inventor: James R. Ekstrom, 5537 Blossom Vista Ave., San Jose, Calif. 95124

[21] Appl. No.: 294,978

[22] Filed: Aug. 21, 1981

[51] Int. Cl.³ .......................... F03B 13/12; E02B 9/08
[52] U.S. Cl. ..................................... 417/331; 60/398; 60/499; 60/501; 60/504; 60/505
[58] Field of Search ................................. 60/495–507; 417/330–334

[56] References Cited

U.S. PATENT DOCUMENTS

| 816,934 | 4/1906 | Newell | 60/500 |
| 1,078,323 | 11/1913 | Trull | 417/332 |
| 4,098,084 | 7/1978 | Cockerell | 417/332 X |
| 4,204,406 | 5/1980 | Hopfe | 60/497 X |
| 4,209,283 | 6/1980 | Marbury | 417/332 |

Primary Examiner—Allen M. Ostrager
Attorney, Agent, or Firm—Gerald L. Moore

[57] ABSTRACT

Apparatus for generating power from wave action comprising a barge (12) and at least one float (14, 15) connected thereto by rigid members (16, 17, 18, 19) pivotally connected thereto by sockets (20). A watertight cylinder (37) including a piston (40) is attached to the barge. Cables (32, 34) connect with the piston and pass through pulleys to the barge. As the wave action rocks the float relative to the barge the piston is moved longitudinally in the cylinder to pump water used for driving a turbine (57) for generating electrical power. Wind vanes (24) and water vanes (27) are also included in the float to enhance the rocking action.

8 Claims, 4 Drawing Figures

WAVE POWERED TURBINE

FIELD OF THE INVENTION

In a copending application Ser. No. 95,016 filed on Nov. 16, 1979 and entitled: Wave Powered Generator, with James R. Ekstrom et al. as inventors, there is described a floating apparatus which makes use of the ocean wave action to turn a shaft. The shaft is turned by a series of cables which extend between adjacent floats. As the floats rise and fall in response to the wave action, cables that extend through pulleys to the various floats and are subsequently wrapped around a shaft cause rotation of the shaft. The shaft in turn is coupled to an electrical generator or other device for generating power.

This invention is an improvement over the earlier wave powered generator and utilizes wave action to pump fluid which in turn powers a turbine or similar device.

It is a primary object of this invention to provide a fluid system wherein wave action acting on adjacent positioned floats is utilized to pump fluid in a manner to turn a power generator.

SUMMARY OF THE INVENTION

Apparatus for generating power from wave action comprising a pair of elongated floats positioned in side-by-side relationship with a barge which includes at least one elongated cylinder having positioned therein a piston. Fluid conduits connected to each end of the cylinder each include one-way valves and connect through an accumulator to a power generator capable of being rotated by fluid pumped through the conduit. Cables extending into the ends of the cylinder are connected to the adjacent side of the piston and pass through pulleys to the other float. Means are provided for supplying water to the cylinder and relative motion between the floats and the barge will cause the cables to move the piston within the cylinder and pump water through the conduits to the accumulator for turning a power generator.

DESCRIPTION OF THE INVENTION

Figure 1:
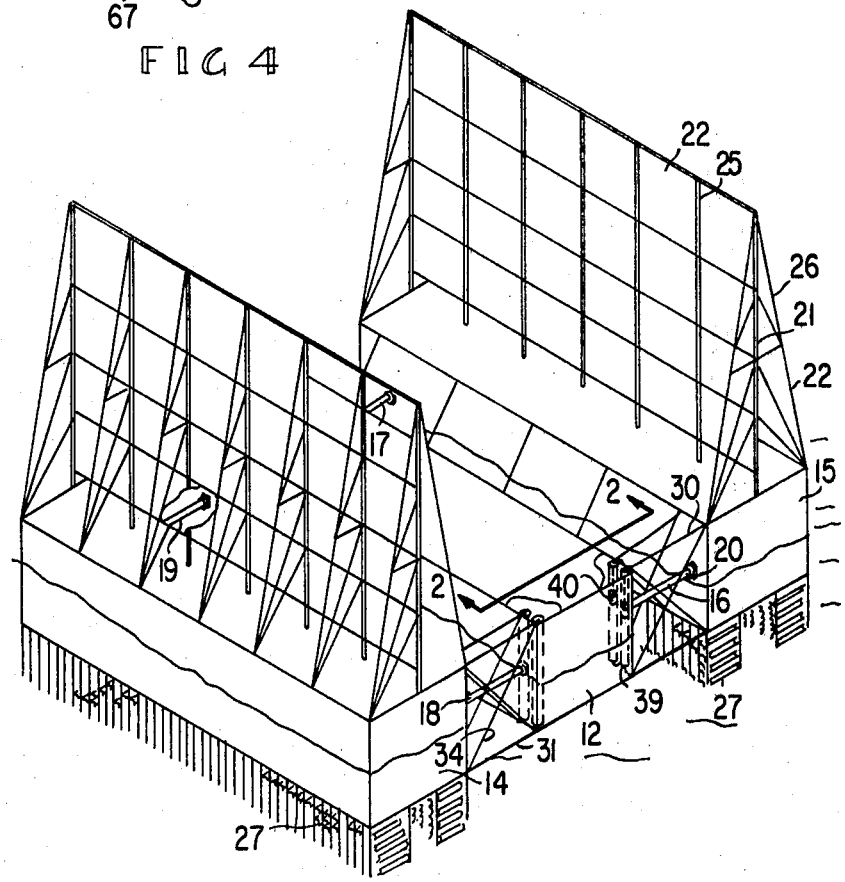
FIG. 1 is a perspective view of a preferred embodiment of the invention.

In FIG. 1 is shown a preferred embodiment of a wave powered generator incorporating the subject invention. A central barge 12 is positioned between and in spaced parallel relationship to a pair of elongated floats 14 and 15. The floats 14 and 15 are each connected to the central positioned barge by a pair of pins 16, 17 and 18, 19 which are pivotally connected at opposite ends by ball-type sockets 20. By such connections the floats are maintained more or less in parallel relationship to the barge but are permitted to rise and fall, sway, rock and pitch relative to each other and within the constraints of the rigid pins 16, 17, 18 and 19. It is this relative movement caused primarily by the wave and wind action acting on the floats and barge that is used to generate power. The relative motions are generally described in the previously identified patent application.

Each float 14 and 15 includes a mast structure 21 held in position by guy wires 22 and supporting a plurality of wind vanes 24 which are controlled in a manner to enhance the relative motion between the floats and the barge. The wind vanes are supported in a manner (not shown) so as to pivot between a position extending in a vertical plane so as to catch the wind and a horizontal position so as not to catch the wind. Preferably these wind current vanes are each made of a rigid material which is strong enough to withstand the force of the wind and also will hold up in the sea spray environment. Additionally there is provided a mechanism (not shown) for actuating the vanes on each float in unison much in the manner that a venetian blind is moved between open and closed positions. A wind pressing on the closed vanes, i.e. vertically positioned vanes, will cause the float to heel over and the opening of the vanes will allow the float to move back to the normal position thereby creating a rocking motion.

Figure 2:
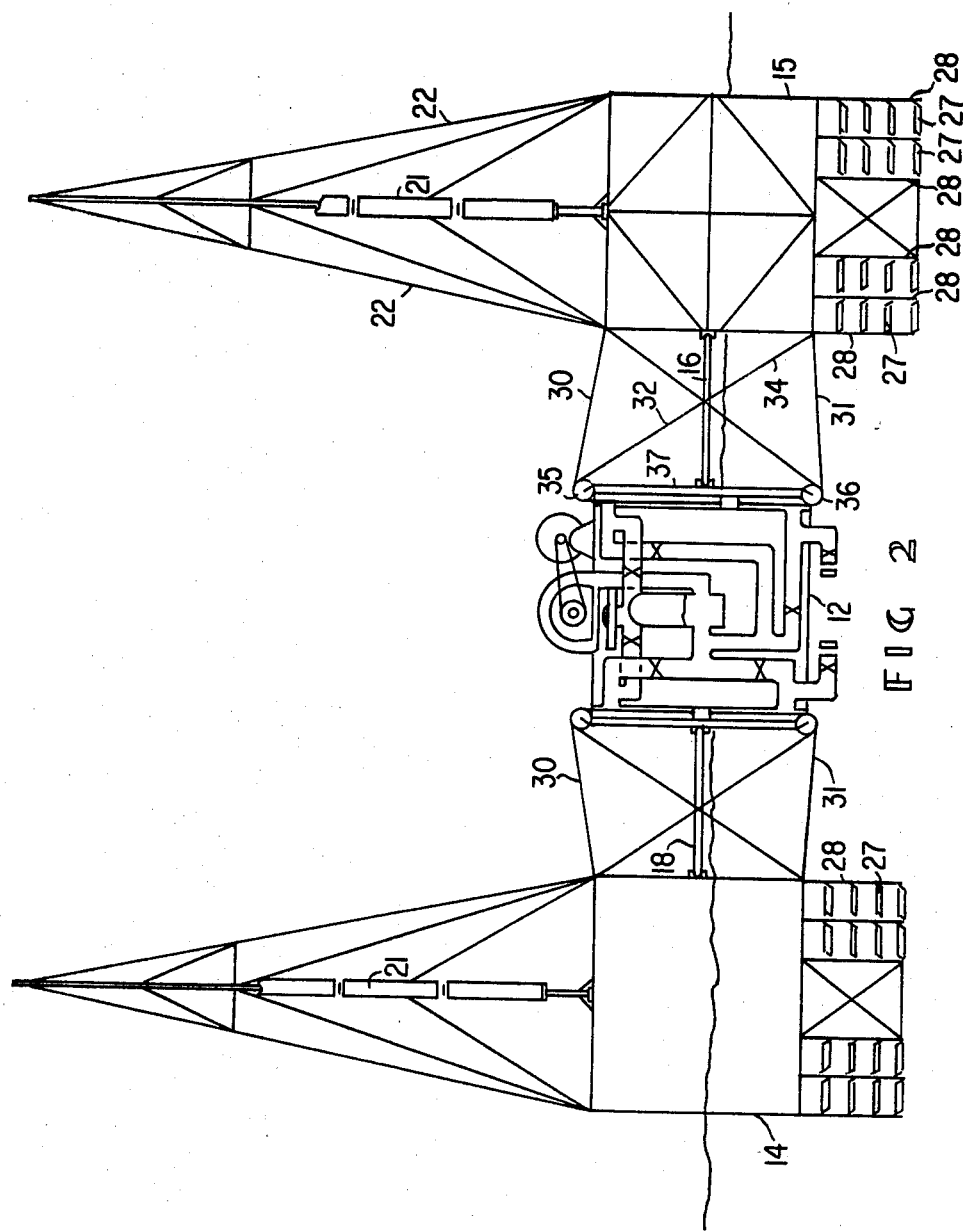
FIG. 2 is an enlarged view along the line 2—2 of FIG. 1.

A plurality of water current vanes 27 (FIGS. 1 and 2) are provided under each float 14 and 15. These vanes are supported on vertically extending supports 28 and are rotatable (preferably in unison) about a longitudinal axis. By specific control of the vanes (in a manner not shown) the vanes can be manipulated so as to cause a rocking motion of the floats and, by cycling such vane movement with the wind vane movement previously described, the floats can be caused to rock relative to the barge.

To make use of this rocking motion in the generation of power, there are provided a plurality of elongated members or cables 30, 31, 32 and 34 having one end fixed to the various locations on the floats. The cables 32 and 34 extend diagonally upward and downward, respectively, to upper and lower pulleys 35 and 36 located at the ends of vertically extending watertight cylinders 37 in the barge. Similarly the cables 30 and 31 extend substantially horizontally over pulleys 38 and 39 positioned at opposite ends of the cylinders 37 and 38.

Figure 3:
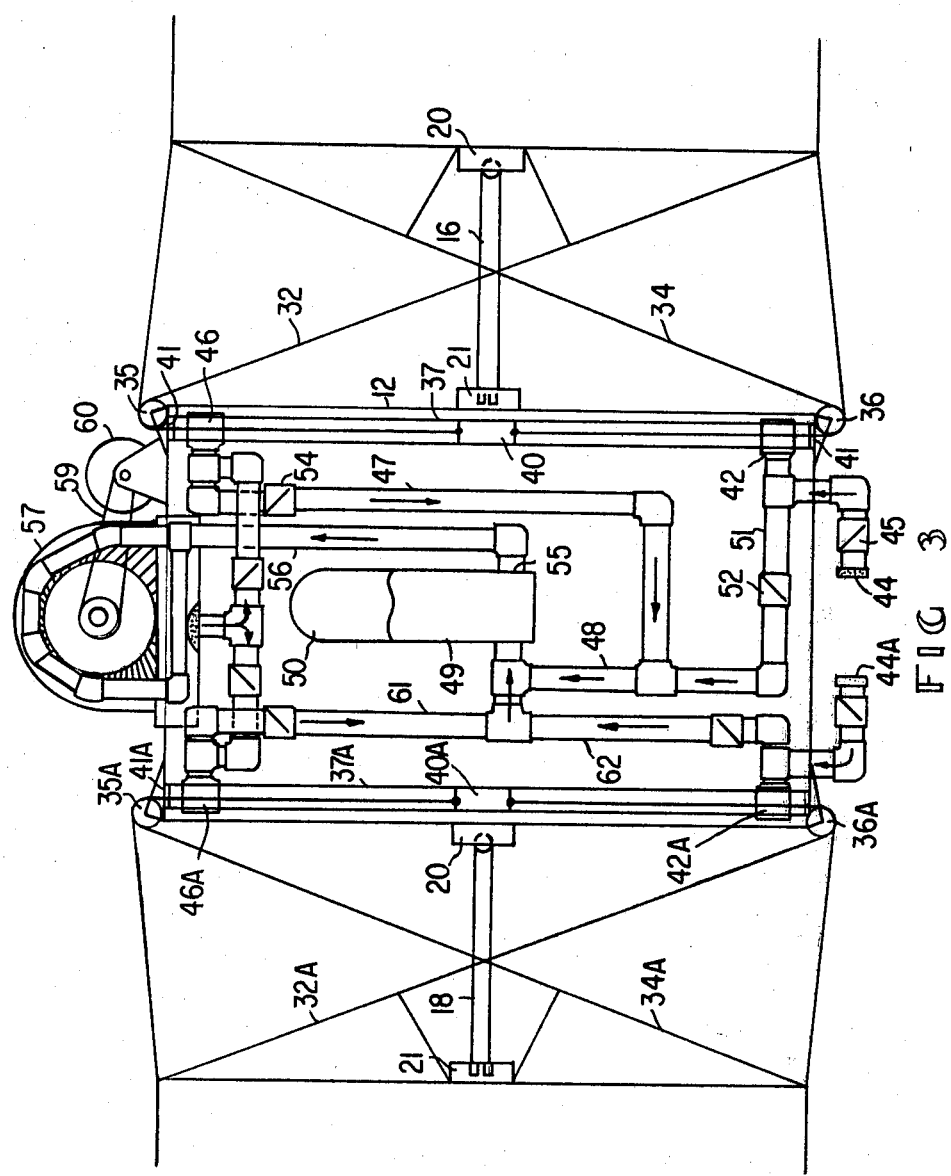
FIG. 3 is an enlarged view of the pumping apparatus shown in FIG. 2.

The cylinders 37 and 38 each function in a similar manner such that only one will be described. However, pairs of such cylinders preferably are positioned at the corners of the float 12 and, if desires, more cylinders can be spaced along the barge. As shown primarily in FIG. 3 wherein a pair of the cylinders are shown in cross-section, a piston 40 is supported therein by the cables 32 and 34 connected to opposite sides. The cables pass through watertight seals 41 at the end of the cylinder. At the lower end of the cylinder is a port 42 connecting to a water inlet 44 extending beneath the float. A one-way valve 45 allows water to be drawn through the inlet 44 and into the cylinder when the piston 40 is moved upward. A separate such inlet with one-way valve is connected with a port 46 positioned at the top of the cylinder (but for simplification is not shown). Thus as the piston moves up and down the evacuated side of the cylinder is always refilled and maintained full by water drawn in from the sea.

In the embodiment shown, upper movement of the piston 40 will force water out through the port 46, down through the conduit 47, up through the conduit 48 and into an accumulator 49. This accumulator is a closed chamber having an air space 50 so that the pumping of pressured water therein pressurizes the air. Subsequent downward movement of the piston 40 will force water through the horizontal conduit 51 and upwards through the conduit 48 into the accumulator. Stop valves 52 and 54 in the conduits 51 and 47, respectively, prevent a back flow of water when water is being forced out of the other end of the cylinder. With pressured water flowing into the accumulator, the air pressure buildup results in a constant flow of water through the outlet 55 in the accumulator and upwards through the conduit 56 to a turbine 57 which when rotated turns a shaft 58. Coupled to the shaft is a drive belt 59 leading to a power generator 60. Thus pressured water forced into the accumulator 49 will result in the turning of the turbine to subsequently drive the power generator.

By use of the accumulator there is a buffet provided which in essence stores energy in the form of air pressure in the accumulator to supply a constant source of pressured fluid to the turbine. Similarly the cylinder-piston combination at the other corner of the barge functions to supply pressure fluid to the accumulator. The cylinder 37A and the connections with the conduits are marked with a similar numbered prefix and the suffix "A" when the function is identical. Thus the piston 40A is pulled up and down by the similar diagonal cables 32A and 34A. These cables pass over pulleys 35A and 36A which run through seals 41A and into the cylinder. As the piston 40A is forced up and down, water is drawn into the inlet 44A in the same manner as previously described and another inlet (not shown) for passage into the cylinder. The cylinder in turn forces fluid through the horizontal pipes 61 and 62 to pass into the same accumulator 49 in the same manner as previously described. Thus there is a parallel flow of fluid into the accumulator as both floats move relative to the barge. Similarly there are positioned in parallel to the cylinders 37 and 37A other cylinders connecting with the horizontal cables 30 and 31, which cylinders function in the same manner to supply pressured water either to the accumulator 49 or to another accumulator (not shown).

Thus as described there is provided a pump and valve system for transmitting the fluid from the pump to the turbine for driving the generator 60. By use of the closed pressure system, the energy input to the turbine is smoothed out so as not to be as cyclic as might occur otherwise due to the rocking motion of the floats. Water is readily available from the surrounding medium and the power can be generated on a more or less constant basis assuming the presence of current and/or wind for moving the float. Additionally any number of closed pressure systems can be positioned on the barge so long as there is physical space and flotation and these other systems. All the systems can be caused to turn turbines operating on the same shaft 58, or turbines independently connected to other generators.

Figure 4:
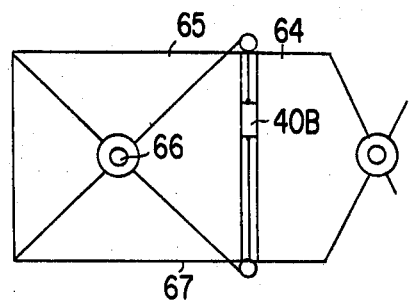
FIG. 4 is a second embodiment of a portion of the invention.

In FIG. 4 is shown another embodiment of the invention. Shown therein is a barge 64 and float 65. The barge and float are connected by a pin 66 extending lengthwise through a housing rigidly fixed to the adjacent side of the floating craft. This connecting arrangement allows the craft to pivot under action of the ocean current and wind current but prohibits relatife up and down motion. Such an arrangement simplifies the relative motion and makes more rigid the connecting of the craft. Cables 66 and 67 are connected between the barge and float in the same manner as described before, with the ends of the cables connected to opposite sides of a piston 40B to pump water to a system in the same manner as previously described.

I claim:

1. Apparatus for deriving power output from wave action from a fluid comprising:
    a barge;
    a watertight cylinder in said barge and forming a cavity having a longitudinal axis;
    a piston in said cylinder forming a pump;
    a float;
    means supporting said barge and float in the fluid to allow relative motion therebetween due to the wave action;
    a plurality of rigid members fixed at opposite ends to said barge and float by ball-type connectors to allow universal movement therebetween while holding the barge and float apart;
    a plurality of elongate flexible cables connecting said barge and float;
    means fixing one end of said elongated cables to said barge and the other end to said piston such that relative motion between said barge and float will cause said piston to move along the longitudinal axis of said cylinder;
    means supplying fluid to said cylinder;
    a turbine adapted to be driven by fluid;
    conduit means for carrying fluid from said cylinder to said turbine; and
    power generating means connected to be driven by said turbine.

2. Apparatus as defined in claim 1 wherein said elongated members are cables.

3. Apparatus for deriving power output from wave action from a fluid comprising:
    a barge;
    a watertight cylinder in said barge and forming a cavity having a longitudinal axis;
    a piston in said cylinder forming a pump;
    a float;
    means supporting said barge and float in the fluid to allow relative motion therebetween due to the wave action;
    a plurality of elongated members connecting said barge and float;
    means fixing one end of said elongated members to said piston such that relative motion between said barge and float will cause said piston to move along the longitudinal axis of said cylinder;
    means supplying fluid to said cylinder;
    a turbine adapted to be driven by fluid;
    conduit means for carrying fluid from said cylinder to said turbine;
    power generating means connected to be driven by said turbine; and
    said barge and float including wind vanes to enhance the relative motion therebetween.

4. Apparatus as defined in claim 3 including an accumulator connected to receive fluid from said cylinder and to supply fluid to said turbine, said accumulator comprising a closed water chamber partially filled with air which is pressurized above atmospheric pressure by the fluid pumped by said pump.

5. Apparatus as defined in claim 4 include fluid intake ports connected to supply fluid to said cylinder cavity.

6. Apparatus as defined in claim 5 wherein said elongated members comprise cables connected at one end to various locations on said float with the other end extending over a pulley and into said cylinder cavity for attachment to said piston.

7. Apparatus as defined in claim 6 wherein separate cables are extended into each end of said cylinder and are attached to the adjacent side of said piston.

8. Apparatus for deriving power output from wave action from a fluid comprising:
- a barge;
- a watertight cylinder in said barge and forming a cavity having a longitudinal axis;
- a piston in said cylinder forming a pump;
- a float;
- means supporting said barge and float in the fluid to allow relative motion therebetween due to the wave action;
- a plurality of elongated members connecting said barge and float;
- means fixing one end of said elongated members to said piston such that relative motion between said barge and float will cause said piston to move along the longitudinal axis of said cylinder;
- means supplying fluid to said cylinder;
- a turbine adapted to be driven by fluid;
- conduit means for carrying fluid from said cylinder to said turbine; and
- power generating means connected to be driven by said turbine;
- an accumulator connected to receive fluid from said cylinder and to supply fluid to said turbine, said accumulator comprising a closed water chamber partially filled with air which is pressurized above atmospheric pressure by the fluid pumped by said pump; and
- said barge and float include wind vanes to enhance the relative motion therebetween.

* * * * *